United States Patent [19]
Andreasson

[11] Patent Number: 6,106,451
[45] Date of Patent: *Aug. 22, 2000

[54] METHOD AND APPARATUS FOR FORMING SPIRALLY WOUND RECTANGULAR CROSS-SECTION TUBES OF THERMOPLASTIC CARDBOARD STRIPS

[76] Inventor: Ingmar Andreasson, Osbergsgatan 4A, S-426 77 Västra Frölunda, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/051,356
[22] PCT Filed: Oct. 11, 1996
[86] PCT No.: PCT/SE96/01300
  § 371 Date: Apr. 8, 1998
  § 102(e) Date: Apr. 8, 1998
[87] PCT Pub. No.: WO97/13695
  PCT Pub. Date: Apr. 17, 1997

[30] Foreign Application Priority Data

Oct. 11, 1995 [SE] Sweden .................................. 9503560

[51] Int. Cl.⁷ .............................. B31C 1/08; B31C 13/00; B31C 1/06; B31C 11/02; B31C 11/06
[52] U.S. Cl. ......................... 493/300; 493/274; 493/288; 493/295; 493/297; 493/302
[58] Field of Search .................................... 493/274, 288, 493/295, 297, 300, 302

[56] References Cited

U.S. PATENT DOCUMENTS

| | | | |
|---|---|---|---|
| 2,016,273 | 10/1935 | Atwood | 493/299 |
| 2,709,400 | 5/1955 | Bugg | 493/295 |
| 2,756,003 | 6/1956 | Stahl | 493/299 |
| 2,829,191 | 4/1958 | Rodgers, Jr. | 493/295 |
| 3,216,457 | 11/1965 | Zavasnick | 493/297 |
| 3,555,976 | 1/1971 | Carter et al. | 493/274 |
| 3,623,929 | 11/1971 | Wannamaker et al. | 493/288 |
| 4,256,027 | 3/1981 | Strohband | 493/301 |
| 4,300,963 | 11/1981 | Berg | 493/297 |
| 4,473,368 | 9/1984 | Meyer | 493/301 |
| 4,831,938 | 5/1989 | Atterby et al. | . |
| 5,106,356 | 4/1992 | Rhodes et al. | 493/301 |
| 5,468,207 | 11/1995 | Bower et al. | 493/288 |
| 5,547,451 | 8/1996 | Drummond et al. | 493/297 |
| 5,593,375 | 1/1997 | Franci | 493/302 |

FOREIGN PATENT DOCUMENTS

| | | |
|---|---|---|
| 94 852 | 6/1995 | Finland . |
| 2 302 851 | 10/1976 | France . |
| 2 466 402 | 4/1981 | France . |
| 34 13 619 | 10/1995 | Germany . |
| 486 376 | 4/1970 | Switzerland . |
| 95/29849 | 11/1995 | WIPO . |

*Primary Examiner*—Brian L. Johnson
*Assistant Examiner*—Matthew Luby
*Attorney, Agent, or Firm*—Birch, Stewart, Kolasch & Birch, LLP

[57] ABSTRACT

A method of producing a rectangular cross-section cardboard tubing by passing a plurality of cardboard strips having a thermoplastic coating thereon through a heating unit so as to hear the plurality of strips and melt the thermoplastic coating. Thereafter, the plurality of heated strips are passed through a guiding unit so as to align the strips in an overlapped configuration. The aligned plurality of strips are wound around an elongated, rectangular cross-section, rotating core so as to place the plurality of strips in an overlapped, spiral configuration along the core and form a tubing. The tubing is fed along the core, and a cutting unit cuts the tubing into lengths.

7 Claims, 2 Drawing Sheets

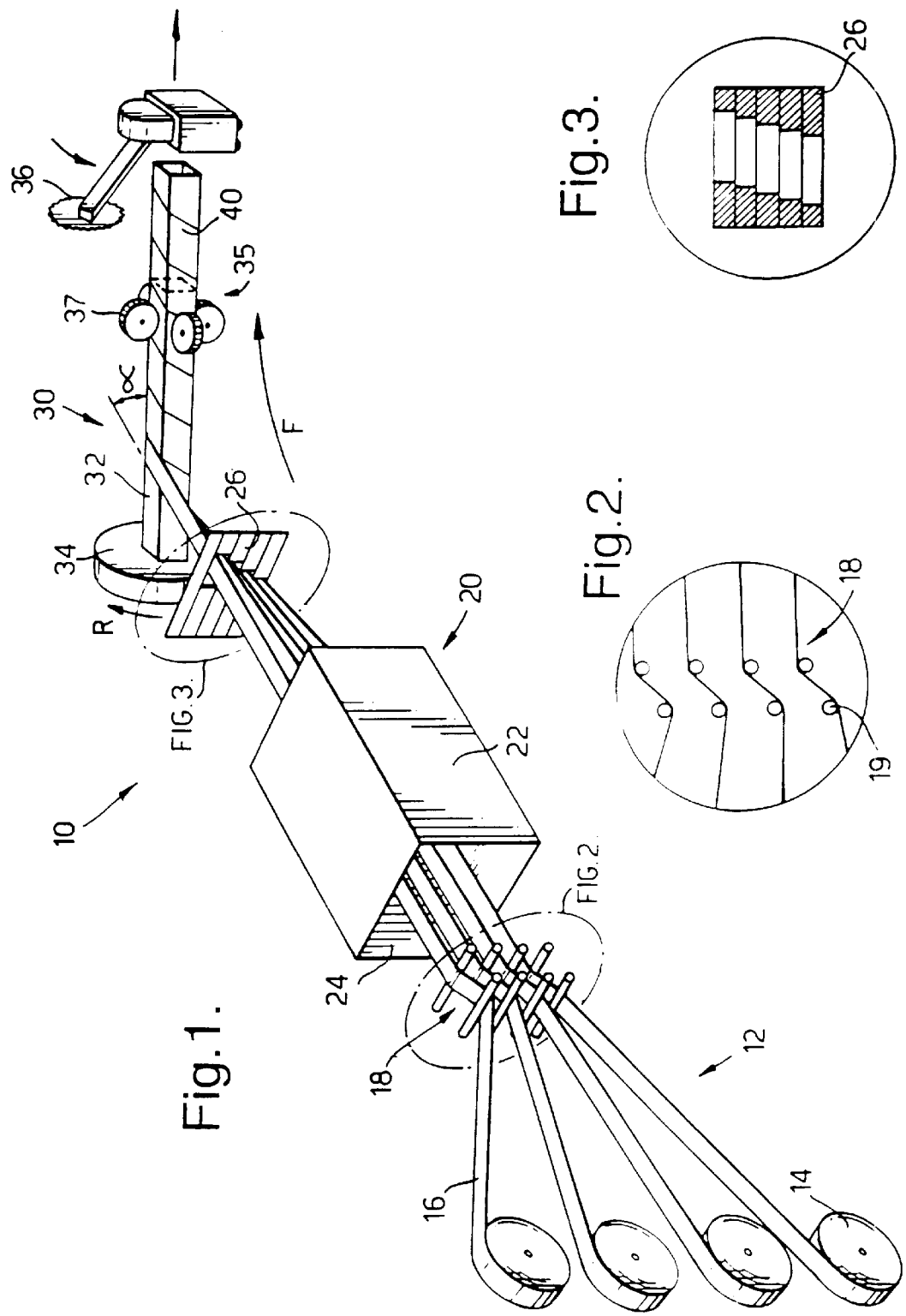

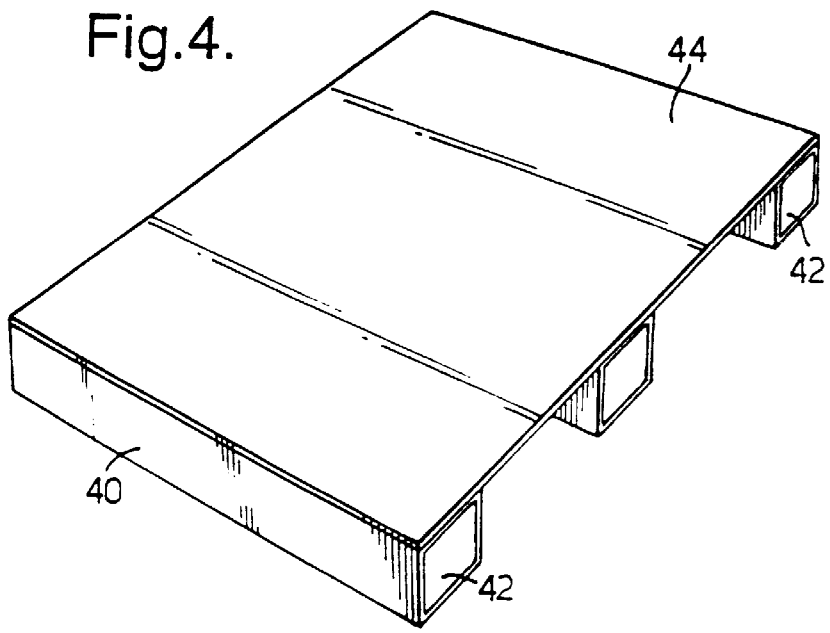
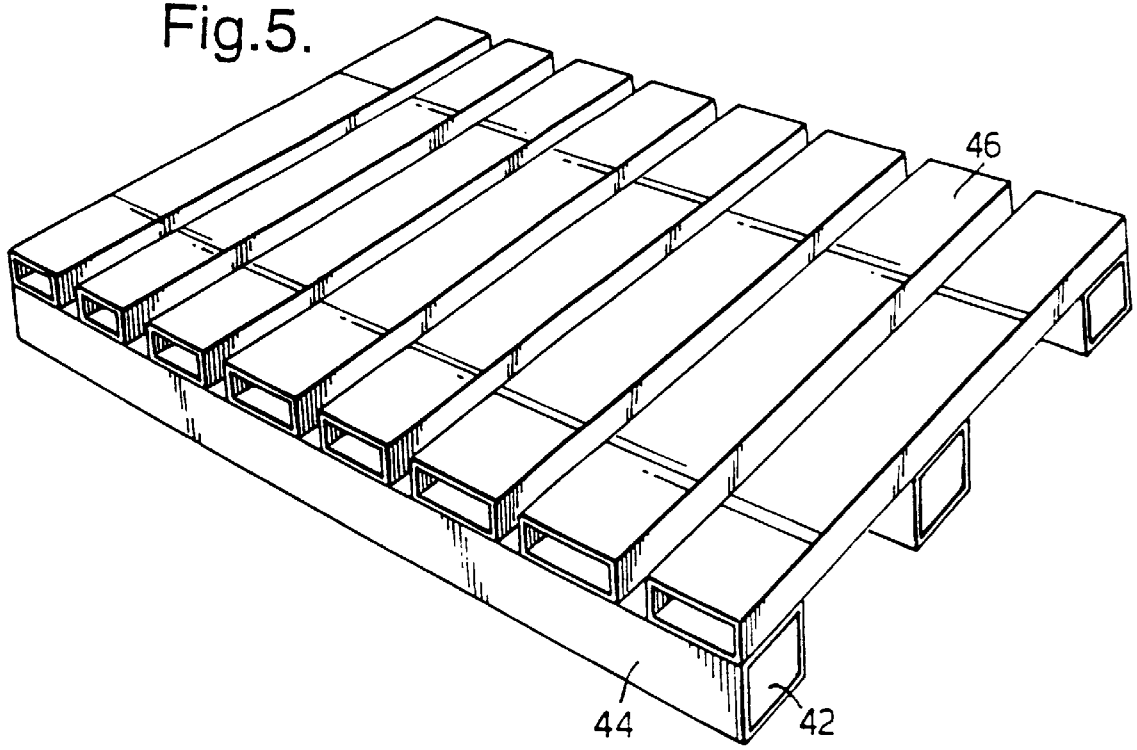

METHOD AND APPARATUS FOR FORMING SPIRALLY WOUND RECTANGULAR CROSS-SECTION TUBES OF THERMOPLASTIC CARDBOARD STRIPS

This application claims priority under 35 USC 371 to PCT/SE96/01300.

FIELD OF INVENTION

The present invention relates to a method for the production of tubes out of paper board, cardboard or similar material, hereafter called cardboard tubes, with rectangular cross section, as well as a device for its production.

DESCRIPTION OF THE BACKGROUND ART

Pallets of varying configurations and in varying materials have long been used in the loading of goods for forwarding by various types of transport. The most common material is and has been wood, a robust material of which a pallet can be produced relatively easily. Wooden pallets are however comparatively heavy, which limits the useful load e.g. for a lorry. Wooden pallets have other disadvantages as well. They have a tendency to absorb moisture, which makes them even heavier as well as discouraging the loading of moisture-sensitive goods such as flour. They are also difficult to clean due to pores and cavities in the wood. They can also contain insects and other creeping creatures, which altogether make them unsuitable from a hygienic point of view. Regarding these considerations as well as environmental considerations, other materials have been brought forth such as paper and cardboard, which are wound into tubing with a number of layers that are joined together with suitable adhesive. In this way a significantly lighter and less expensive construction of the pallet is obtained, with added advantages such as the use of waste material, better hygiene and a pallet that is 100% recyclable.

The problem up to now has been that no one has proposed an optimal construction for strength, stiffness and simplicity in the production of tubes in a pallet made of paper or cardboard. SE-B-459 251 for instance describes a pallet made of a number of base parts in the form of square tubes made of several layers of paper or cardboard. The description gives no information regarding how the layers are joined to each other or how the pallet is treated to withstand moisture. CH-486 376 describes a pallet with three longitudinal base units and a loading deck on these. All components consist of paper wound in several layers, however with a circular form which significantly decreases the possibility of joining these with each other, and which has a detrimental effect on the strength and stiffness of the pallet. Neither does this document deal with the joining of the layers in the tubes.

As to the joining of layers and the moisture resistance of the final product, it is generally so that before winding, the cardboard layers must be treated with suitable media so that they will stick to each other and give the desired strength and in certain cases moisture-protection so that the board does not become damp.

DESCRIPTION OF THE INVENTION

The objective of the present invention is to obtain a simple and effective method for the production of board tubing contained in for example pallets where the starting material does not need treatment before production, the tubes are not treated after production and where preferably waste material from an other industry can be used.

This objective is achieved according to one aspect of the invention by a method for production of board tubes with rectangular cross section, characterized in that layers of cardboard coated with thermoplastic are heated and joined to each other by winding in spiral around a rectangular core during formation of the tube.

According to one aspect of the invention, a device is obtained for achievement of the method, characterized in that it includes a first means for heating of a number of layers of cardboard coated with a thermoplastic as well as a second means for winding and forming of the heated layers to tubing.

According to another aspect of the invention, the means for winding includes an elongated core with rectangular cross section as well as a driving means for rotating the core, by which the heated layers are wound onto the core.

According to a further aspect of the invention, a pallet is obtained produced of tubing which in turn is produced according to the method, characterized in that it includes a number of base tubes as well as a deck unit, where the deck unit is joined to the base tubes by heating at least the upper sides of the base tubes.

These and other aspects and advantages of the present invention will be evident from the following detailed description of a conceivable embodiment of a device for the achievement of the method.

BRIEF DESCRIPTION OF THE DRAWINGS

A preferred embodiment of the invention will now be described with reference to the accompanying drawings, in which FIG. 1 shows a schematic sketch of a device for the production of tubing of plastic-coated board;

FIG. 2 is a detailed view of a stretching device included in the device according to FIG. 1;

FIG. 3 is a detailed view of a guiding unit included in the device according to FIG. 1;

FIG. 4 illustrates a conceivable embodiment of a pallet produced of tubes according to the method of the invention; and FIG. 5 shows another conceivable embodiment of a pallet.

DESCRIPTION OF A PREFERRED EMBODIMENT

The device shown in the drawings is identified generally by the reference numeral 10. The device includes a material unit 12 where starting material is handled. The starting material is cardboard coated with thermoplastic cut in strips 16 and arranged in coils 14. The strips 16 run along a stretching device 18, which for example is embodied as a pair of rods 19 for each strip around which the strips run, through a heating unit 20, which for example is embodied by a heat-insulated containment 22 with openings 24 in opposite walls, through which the strips 16 run. The heating unit 20 can include various heat-generating devices such as LP-gas burners, halogen lamps, IR-lamps etc to obtain a temperature which melts the thermoplastic on the cardboard strips. The strips 16 run then by a guiding unit 26 in the form of openings arranged to position the layers on top of each other in an overlapping manner, to a winding unit 30. The winding unit 30 includes a core 32 embodied by an elongated rod with a driving means 34 that rotates the core and a forward-feeding device 35 in the form of driven rolls 37 arranged on at least one of the sides of the cores and arranged to follow during the rotation of the core 32.

Following the core in the flow direction F of the core, a cutting unit 36 is arranged. The cutting unit 36 comprises some suitable means for cutting-off, such as blades, knives, water-jets, laser etc for cutting the tubes 40 produced in the winding unit; these are arranged to follow with the tube during cutting, in so-called flying cutting.

The device functions such that a number of strips 16 with thermoplastic-coated cardboard, the number depending on the desired thickness of the produced tubes, are led into the heating unit 20. The strips are guided so that they lay over each other with space in between. In the heating unit 20, the strips and plastic are heated so that the plastic melts. The strips are then led further on to the core 32 which rotates. The strips are guided here so that they arrange themselves in an overlapping fashion at a certain angle α to the core. The strips are also oriented so that the outer layer covers the edges of the underlying layers to obtain as few strip edges as possible on the finished tube. Due to the stretching arrangement 18 the strips are held tightly while being wound. In this way the strips are wound in spiral in several layers onto the core and a continuous production of cardboard tubing is obtained. At the same time the produced tube is fed forwards and off of the core 32 by means of the driven coils 37. Due to it being heated up, the plastic functions as a binder between the layers and a good adhesion between the cardboard layers is obtained. By the spiral winding a continuous cardboard tube is produced which is steadily fed off of the core. At suitable intervals the cardboard tubing is cut by the flying cutting unit 36. The tubes 40 are preferably embodied with rectangular cross section, i.e. the core is preferably rectangular, to obtain planar areas for joining to other coated cardboard tubes. The cardboard can be coated on one side or on both sides; good adhesion between the layers is obtained in both cases. For instance by cutting off the tubes with laser, a sealing of the end areas can be obtained.

There are several advantages with the described method and device. The starting material requires only heating and winding to produce tubes with good strength and moisture resistance as well as a relatively low weight. As well, preferably waste material from other industries is used such as material from the production of watertight cardboard, which is usually cardboard coated with polyethylene plastic on at least one side.

The produced tubes can be used within a variety of areas. One is in the production of cardboard pallets, where the thermoplastic is again utilized. FIG. 4 shows an example of a pallet produced with polyethylene plastic-coated cardboard, where a whole plate 44 is joined to a number of base tubes 40, produced by the above-mentioned method and device, by heating of the upper sides of base tubes 40. The plate can be of suitable material such as carton, corrugated cardboard, masonite etc to give the pallet stiffness. The base tube 40 is preferably arranged with stiffening elements in the form of tube pieces 42 placed on end inside the base tubes. The stiffening element 42 is preferably made in the same way as the base tubes.

FIG. 5 shows another example where deck tubes 46 are joined to a number of base tubes 40 by heating of the bottom sides of deck tubes 46 as well as the upper sides of base tubes 40, by which a good adhesion of the deck- and base tubes can be achieved. If required, the cut end edges can be sealed by coating with suitable protection. More detailed description of pallets produced according to this method is obtained in the Swedish application no: 9401481-8 by the inventor of the present invention, which is incorporated as a reference.

Pallets produced according to the above method and device can be used as disposable pallets, or, due to their strength and resistance can be used several times. On production the number of layers to be wound can be chosen depending on the desired strength and length of life. Another area of application is as moulds for the casting of concrete foundations etc. It is advantageous here as well that the tubes be rectangular, as the finished foundation gives planar areas on which other material can be placed. A further advantage compared with the conventional tubes for casting is that the tubes according to the invention are coated and can better resist moisture.

As is evident there are many areas of application for the invention and from an environmental point of view the method and arrangement as well as the produced products display several advantages. Firstly, waste from other industries can be utilized, instead of going to waste management or incineration. Secondly no further media are added for the production of tubes or for their protection. Thirdly, the tubes contain no environmentally harmful substances and the material can be either recycled to board or plastic briquettes when they have served their purpose, or incinerated, where the energy content is twice as high as for firewood. Polyethylene plastic forms only carbon dioxide and water on incineration.

It will be understood that the invention is not restricted to the described and illustrated embodiment and that modifications can be made within the scope of the following claims.

What is claimed is:

1. A method of producing a rectangular cross-section cardboard tubing, comprising:
    (1) passing a plurality of cardboard strips having a thermoplastic coating thereon through a heating unit so as to heat the plurality of strips and melt the thermoplastic coating;
    (2) passing the plurality of heated strips through a guiding unit so as to align the strips in an overlapped configuration;
    (3) winding the aligned plurality of strips around an elongated, rectangular cross-section, rotating core so as to place the plurality of strips in an overlapped, spiral configuration along the core and form a tubing;
    (4) feeding the tubing along the core; and
    (5) cutting the tubing into lengths.

2. The method of claim 1, wherein the plurality of overlapped cardboard strips are wound around the core in a single winding thereof.

3. The method of claim 1, wherein a stiffening element in the form of pieces (42) of the cardboard tubing is placed on end on an inside of the length of the cut tubing.

4. A device for producing a rectangular cross-section cardboard tubing, comprising:
    (1) a heating unit for passing therethrough a plurality of cardboard strips having a thermoplastic coating thereon so as to heat the plurality of strips and melt the thermoplastic;
    (2) a guiding unit for aligning the plurality of heated strips in an overlapped configuration;
    (3) a rotatable rectangular cross-section core for winding the aligned plurality of heated strips therearound so as to place the plurality of strips in an overlapped, spiral configuration along the core and form a tubing;
    (4) a feeder for feeding the tubing along the core; and
    (5) a cutting unit for cutting the tubing into lengths.

5. Device according to claim 4, wherein the cutting unit (36) is arranged after the core (32) seen in a feeding direction (F) for flying cutting of the tubing (40) into suitable lengths.

6. The device of claim 4, wherein the plurality of overlapped cardboard strips are placed on the core in a single application thereof.

7. The device of claim 4, including means for cutting pieces (42) of the lengths of the cardboard tubing for placing the pieces on end on an inside of the lengths of the cut tubing so as to form a stiffening element therein.

\* \* \* \* \*